US009354808B2

(12) United States Patent
Otsu

(10) Patent No.: US 9,354,808 B2
(45) Date of Patent: May 31, 2016

(54) DISPLAY CONTROL DEVICE, DISPLAY CONTROL METHOD, AND PROGRAM

(71) Applicant: Sony Corporation, Tokyo (JP)

(72) Inventor: Shuichi Otsu, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 52 days.

(21) Appl. No.: 14/148,894

(22) Filed: Jan. 7, 2014

(65) Prior Publication Data

US 2014/0198065 A1    Jul. 17, 2014

(30) Foreign Application Priority Data

Jan. 16, 2013    (JP) .................................. 2013-005342

(51) Int. Cl.
*G06F 3/045* (2006.01)
*G06F 3/0488* (2013.01)
*G06F 3/0489* (2013.01)

(52) U.S. Cl.
CPC .......... *G06F 3/0488* (2013.01); *G06F 3/04883* (2013.01); *G06F 3/04895* (2013.01); *G06F 2203/04801* (2013.01)

(58) Field of Classification Search
CPC ........ G06F 3/041; G06F 3/048; G06F 3/0488
USPC .................................................. 345/172–178
See application file for complete search history.

(56) References Cited

U.S. PATENT DOCUMENTS

| 2007/0236475 | A1* | 10/2007 | Wherry ......................... 345/173 |
| 2010/0283744 | A1* | 11/2010 | Nordenhake ....... G06F 3/04883 345/173 |
| 2012/0137216 | A1* | 5/2012 | Choi ............................ 715/255 |
| 2014/0292726 | A1* | 10/2014 | Nakano et al. ................ 345/178 |

FOREIGN PATENT DOCUMENTS

JP    2012-094010 A    5/2012

* cited by examiner

*Primary Examiner* — Kent Chang
*Assistant Examiner* — Nelson Rosario
(74) *Attorney, Agent, or Firm* — Chip Law Group

(57) ABSTRACT

A display control device including a display control unit that displays a decoration image on a display unit, the decoration image being different from images used for operation, a detection unit that detects a user's touch operation made on the display unit, and a processing unit that executes a process associated with the touch operation involving a predetermined trajectory. When the touch operation involving the predetermined trajectory is detected while the decoration image is displayed, the display control unit displays a feedback image that is made up of the decoration image and indicates that the touch operation involving the predetermined trajectory has been detected.

12 Claims, 17 Drawing Sheets

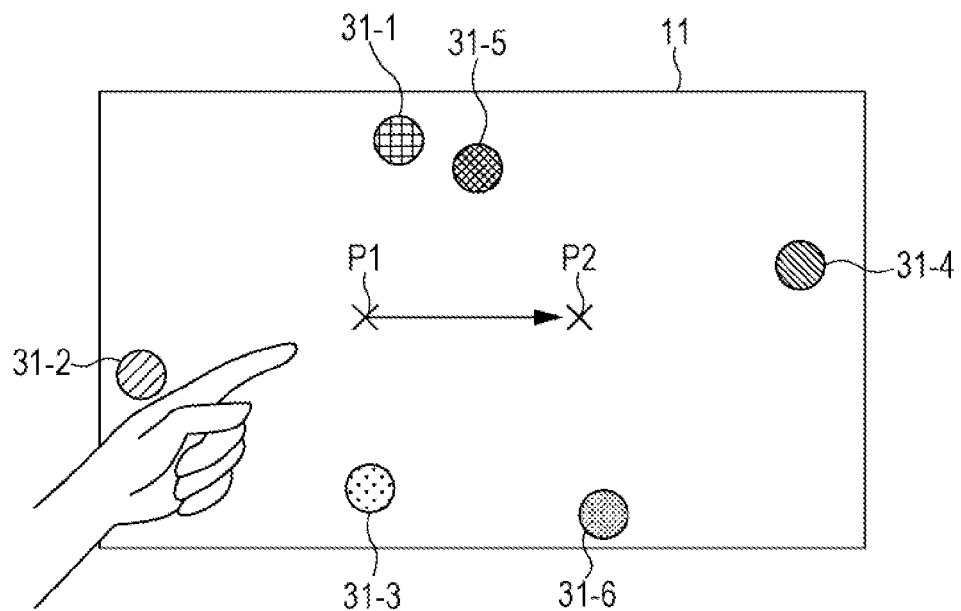
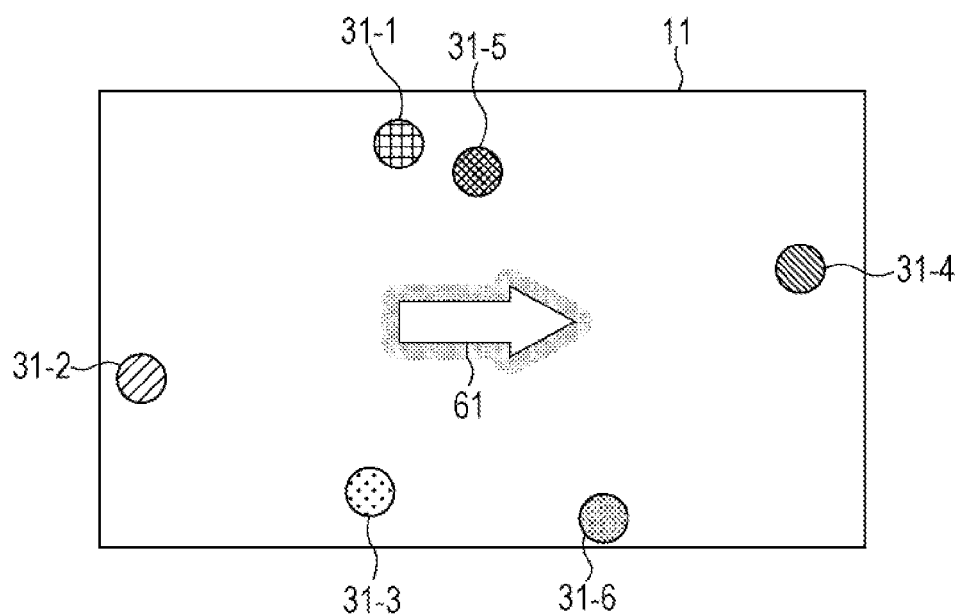

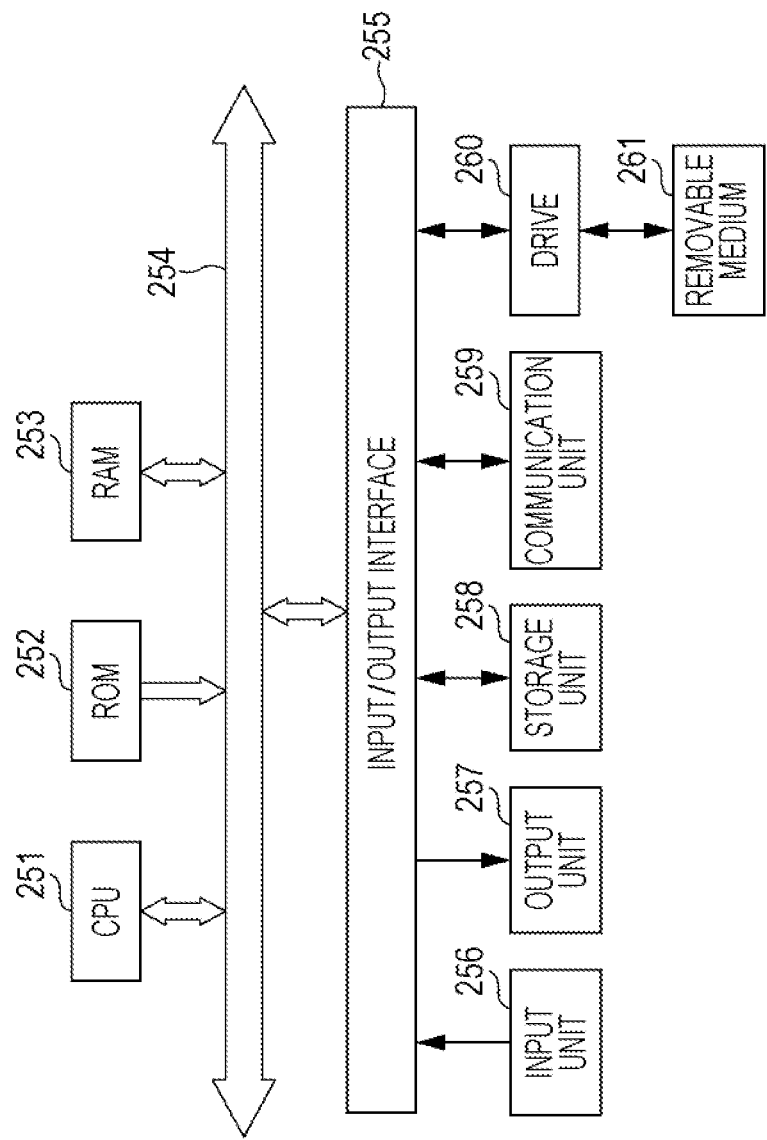

DISPLAY CONTROL DEVICE, DISPLAY CONTROL METHOD, AND PROGRAM

CROSS REFERENCE TO RELATED APPLICATIONS

This application claims the benefit of Japanese Priority Patent Application JP 2013-005342 filed Jan. 16, 2013, the entire contents of which are incorporated herein by reference.

BACKGROUND

The present technology relates to display control devices, display control methods, and programs, and more particularly, to a display control device, a display control method, and a program capable of presenting feedback with high visibility.

SUMMARY

GUI (Graphical User Interface) interactions using a touch panel are made by two types of common manipulations, direct operations and gesture operations.

The direct operations are used to manipulate objects that make up a GUI, such as buttons and slide bars, by tapping, dragging, flicking or other actions. The gesture operations draw a predetermined trajectory on the screen by dragging, flicking or other actions to execute a process associated with the trajectory.

Common feedback in response to the direct operations includes illuminating the button that was manipulated, changing the color and shape of the button, and so on. A feedback technique in response to gesture operations is disclosed in Japanese Unexamined Patent Application Publication No. 2012-94010, in which a plurality of light spot display portions arranged on a touch panel surface illuminate in accordance with the movement of a finger.

Some apparatuses with music playback functions include a so-called visualizer function. The visualizer function provides visual effects by transforming images during the playback of contents, that is, songs.

If an apparatus with the visualizer function provides feedback in response to a gesture operation or, for example, illuminates the light spot display portions as described in Japanese Unexamined Patent Application Publication No. 2012-94010, some adjustments, such as a reduction in brightness of the entire visualizer and a change of the button layout, may necessary to improve the visibility.

The present technology has been made in view of such circumstances and, for example, causes the apparatus with the visualizer function to present feedback with high visibility in response to gesture operations.

A display control device according to an embodiment of the present technology includes a display control unit that displays on a display unit a decoration image that is different from images used for operation, a detection unit that detects a user's touch operation on the display unit, and a processing unit that executes a process associated with the touch operation involving a predetermined trajectory. In this embodiment, when the touch operation involving the predetermined trajectory is detected while the decoration image is displayed, the display control unit displays a feedback image that is made up of the decoration image and indicates that the touch operation involving the predetermined trajectory has been detected.

The display control unit can display the decoration image moving around within a screen by a visualizer function.

The display control unit can display a plurality of the decoration images and the feedback image to be displayed can be made up of all of the decoration images.

The display control unit can move the decoration images individually from their respective positions at a time when the touch operation involving the predetermined trajectory is detected to display the feedback image.

The display control unit can display a plurality of the decoration images and transform one of the decoration images to display the feedback image.

The display control unit can display information about a song that is currently being played over the decoration image.

The display control unit can display an image representing the trajectory of the touch operation as a decoration image and transforms the image representing the trajectory to display the feedback image.

The display control unit can display the decoration image over information about a song that is currently being played.

The display control device can further include an output control unit that outputs a predetermined sound when the touch operation involving the predetermined trajectory is detected.

According to an embodiment of the present technology, a decoration image, which is different from images to be used for operations, is displayed on the display unit, a user's touch operation on the display unit is detected, and a process associated with the touch operation involving the predetermined trajectory is executed. When the touch operation involving the predetermined trajectory is detected while the decoration image is displayed, the display control unit displays a feedback image that is made up of the decoration image and indicates that the touch operation involving the predetermined trajectory has been detected.

The present technology can present feedback with high visibility.

BRIEF DESCRIPTION OF THE DRAWINGS

FIG. 8 illustrates an example of an image subsequent to the image in FIG. 7;

FIG. 9 illustrates an example of an image subsequent to the image in FIG. 8;

FIG. 26 is a block diagram showing an example of a computer configuration.

DETAILED DESCRIPTION OF EMBODIMENTS

In the following, embodiments for carrying out the present technology will be described. The description will be given in the following order.

1. First Embodiment (example of feedback using visualizer image)

2. Second Embodiment (example of feedback using trajectory image)

<First Embodiment (example of feedback using visualizer Image)>

[Exemplary Appearance of Electronic Apparatus]

Figure 1:
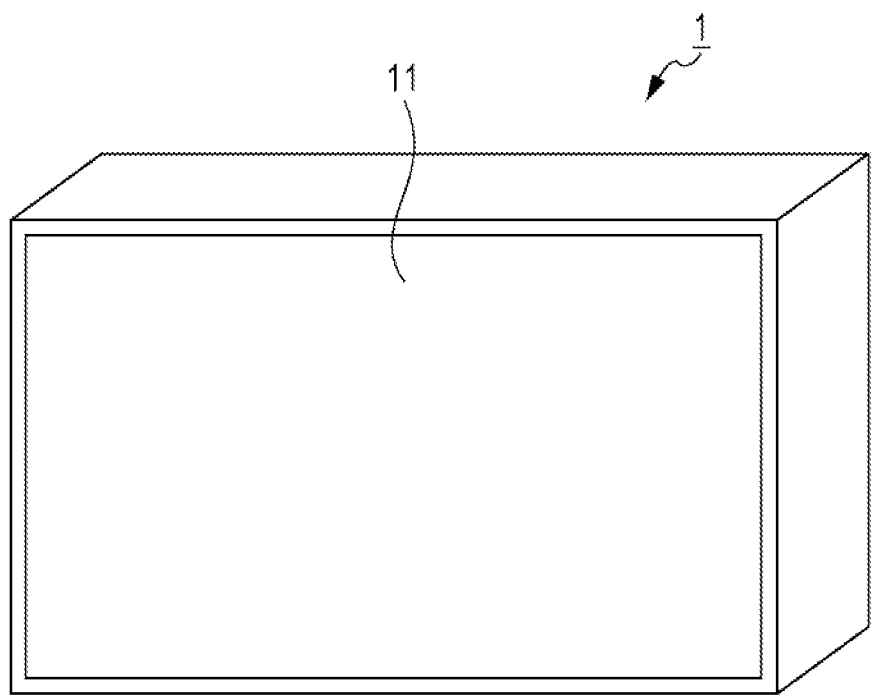
FIG. 1 shows an exemplary appearance of an electronic apparatus according to an embodiment of the present technology.

FIG. 1 shows an exemplary appearance of an electronic apparatus according to an embodiment of the present technology.

The electronic apparatus 1 is a car audio system or another type of electronic apparatus. A display unit 11 is provided across nearly the whole front surface of the rectangular parallelepiped housing of the electronic apparatus 1. The electronic apparatus 1 has a function of reproducing music data stored in an internal memory.

Figure 2:
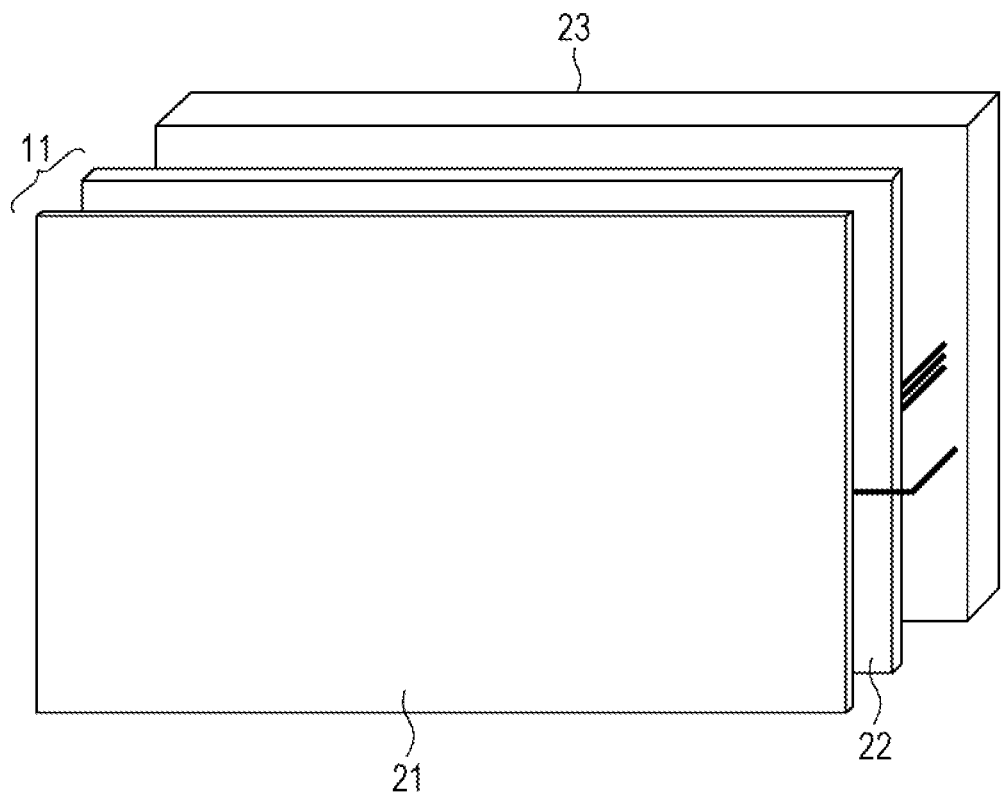
FIG. 2 illustrates an exemplary structure of a display unit.

FIG. 2 shows an exemplary structure of the display unit 11.

The display unit 11 includes a display 22 and a touch panel 21 placed on the display 22. A user can input various operational instructions relating to music reproduction, such as selection of a piece of music, start of playback, and a pause, by touching the surface of the display unit 11 with a finger or the like.

A graphic processor 23 is provided in the electronic apparatus 1. The graphic processor 23 displays various pieces of information on the display 22 and outputs information about a user's touch input detected by the touch panel 21 to a microcomputer (not shown) under control of the microcomputer.

The electronic apparatus 1 may be any type of apparatus as long as it can detect a user's manipulation through the touch panel provided on the display, including mobile phones, tablet terminals, PCs, video game devices, and so on in addition to car audio systems.

[Example of Music Playback Screen]

Figure 3:
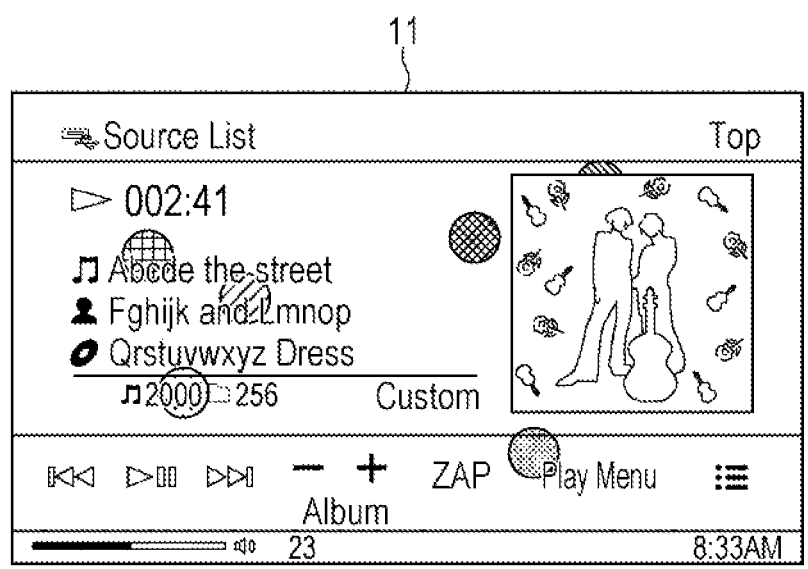
FIG. 3 illustrates an example of a music playback screen.

FIG. 3 illustrates an example of a music playback screen displayed on the display unit 11.

The music playback screen in FIG. 3 appears, for example, when a song to be played is selected after a music playback function is selected from a menu screen of the electronic apparatus 1. Information about the song is displayed on the display unit 11, such as the song title, artist name, album title, time elapsed, and cover art, all of which are displayed with an image created by a visualizer function displayed as a background.

Thus, the electronic apparatus 1 includes a visualizer function that provides visual effects by transforming an image object into a predetermined shape.

In the example of FIG. 3, the visualizer function displays an image in which colorful circular images are moving around within the screen. Some of the circular images are hatched and some are patterned to represent different colors. Where appropriate, the image created by the visualizer function is referred to as a visualizer image.

The music playback screen is composed of a wallpaper image layer, a visualizer image layer, a song information layer, and a gesture operation image layer, which are disposed in this order from the bottom.

Figure 4:
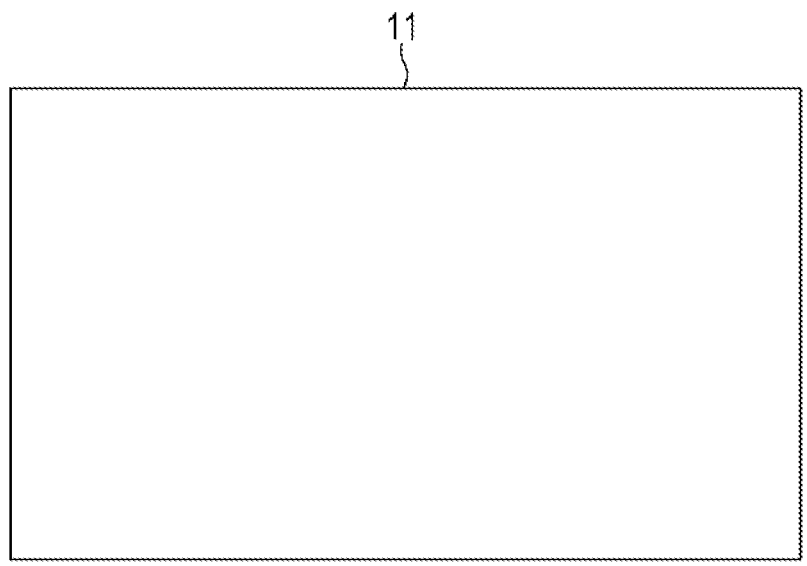
FIG. 4 illustrates an example of a wallpaper image.

FIG. 4 illustrates an example of the wallpaper image.

The example in FIG. 4 shows a predetermined colored, plain wallpaper image. A user can choose an image from a plurality of images prepared in advance and set it as the wallpaper image.

Figure 5:
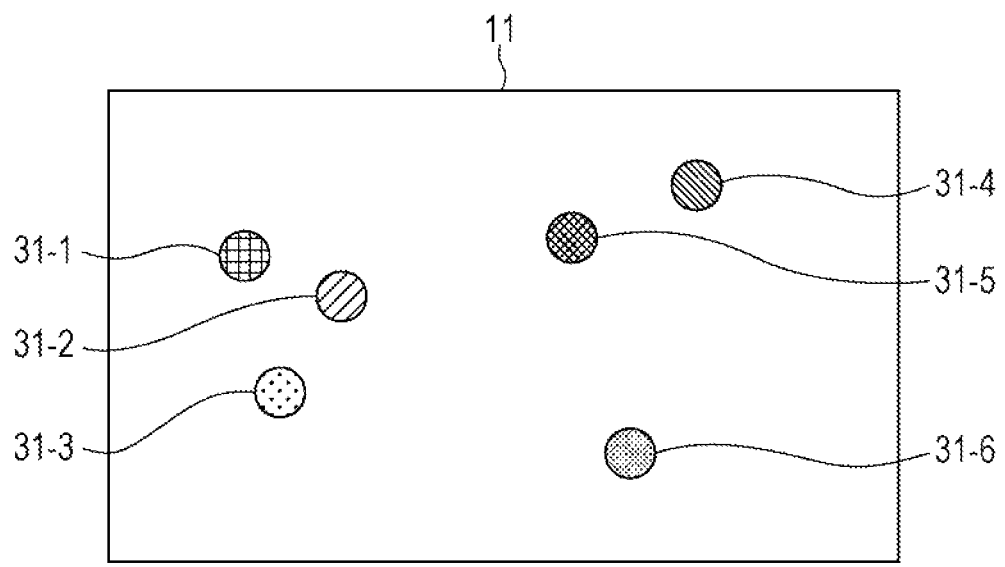
FIG. 5 illustrates an example of a visualizer image.

FIG. 5 illustrates an example of a visualizer image.

The visualizer image in FIG. 5 includes images of six circles, namely circular images 31-1 to 31-6. For example, the circular images 31-1 to 31-6 are different from each other in color. The circular images 31-1 to 31-6 are not images to be used for operation, but are decoration images to be displayed for decorating the screen.

Figure 6:
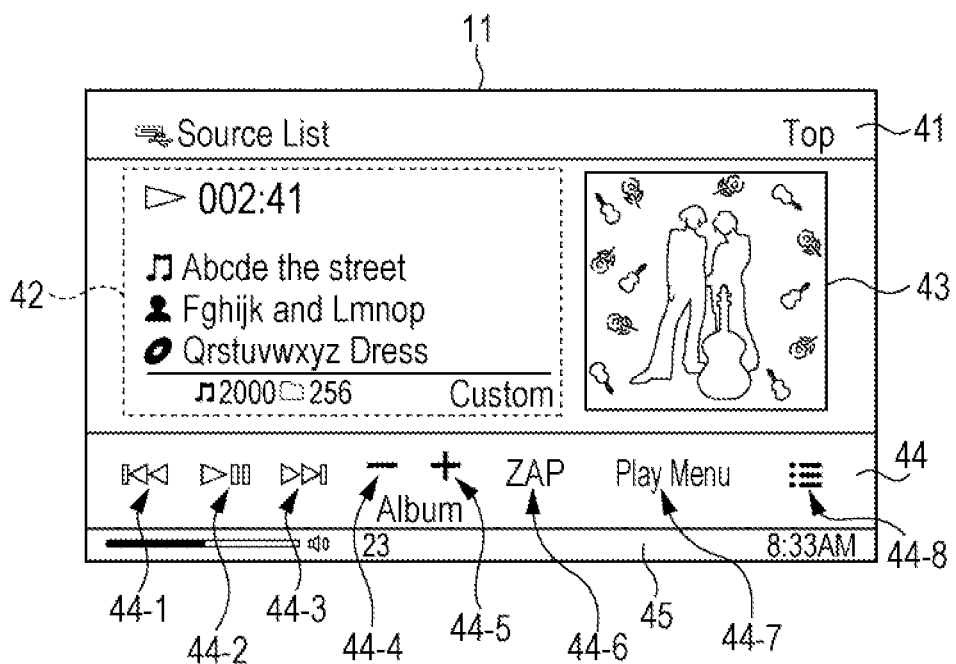
FIG. 6 illustrates an example of song information.

FIG. 6 illustrates an example of song information.

The song information includes a tool button area 41, a song information area 42, a cover-art image area 43, an operation button area 44, and a setting information area 45.

The tool button area 41 is an area that displays a "Top" button that may be manipulated in order to display the top screen of the electronic apparatus 1, and other buttons. The song information area 42 is an area that displays information about the song that is currently being played, such as a song title (file name), an artist name, and an album title (folder name). The cover-art image area 43 is an area that displays the cover art image of the song currently playing.

The operation button area 44 is an area that displays operation buttons to be used to control music reproduction, such as a button 44-1 that may be manipulated to return to the previous song, a button 44-2 that may be manipulated to play or pause songs, a button 44-3 that may be manipulated to go to the next song, and buttons 44-4, 44-5 that may be manipulated to change albums. The electronic apparatus 1 organizes songs by albums, and the albums and songs to be played are ordered in a playlist.

The operation button area 44 also displays a button 44-6 that may be manipulated to select playback mode, a button 44-7 that may be manipulated to display a playback menu, and a button 44-8 that may be manipulated to display a setting menu. The buttons displayed in the operation button area 44 are manipulated through direct operation.

The setting information area 45 is an area that displays indicators of volume, time, and so on.

While the music playback screen made up of these overlapping layers is displayed, a user can perform the same operations as those executed by the buttons displayed in the operation button area 44, through gesture operations. The electronic apparatus 1 is provided with a function of detecting trajectories of the user's touch operations.

For example, a left drag movement invokes a process to return to the previous song to play it. In other words, the left drag movement is a "previous song" gesture operation to invoke performance of the same operation as the button 44-1. Dragging is a manipulation achieved by touching a screen with a finger, moving the finger while maintaining contact with the screen, and then taking the finger off the screen.

A right drag movement invokes a process to go to the next song to play it. In other words, the right drag movement is a "next song" gesture operation to invoke performance of the same operation as by the button 44-3.

An up drag movement invokes a process to go to the first album before the current album to play it. In other words, the up drag movement is a "previous album" gesture operation to invoke performance of the same operation as by the button 44-4.

A down drag movement invokes a process to go to the first album after the current album to play it. In other words, the down drag movement is a "next album" gesture operation to invoke performance of the same operation as by the button 44-5.

A tap given while a song is paused resumes playing the song and a tap given while a song is playing pauses the song. Tapping is a manipulation achieved by touching a screen with a finger and taking the finger off within a defined range around the position touched.

When a gesture operation is detected, a feedback image made up of a visualizer image is displayed to indicate that the gesture operation has been detected.

[Example of Feedback Image]

A description about the feedback image will be made in detail. For ease of illustration, the image of song information is omitted.

Figure 7:
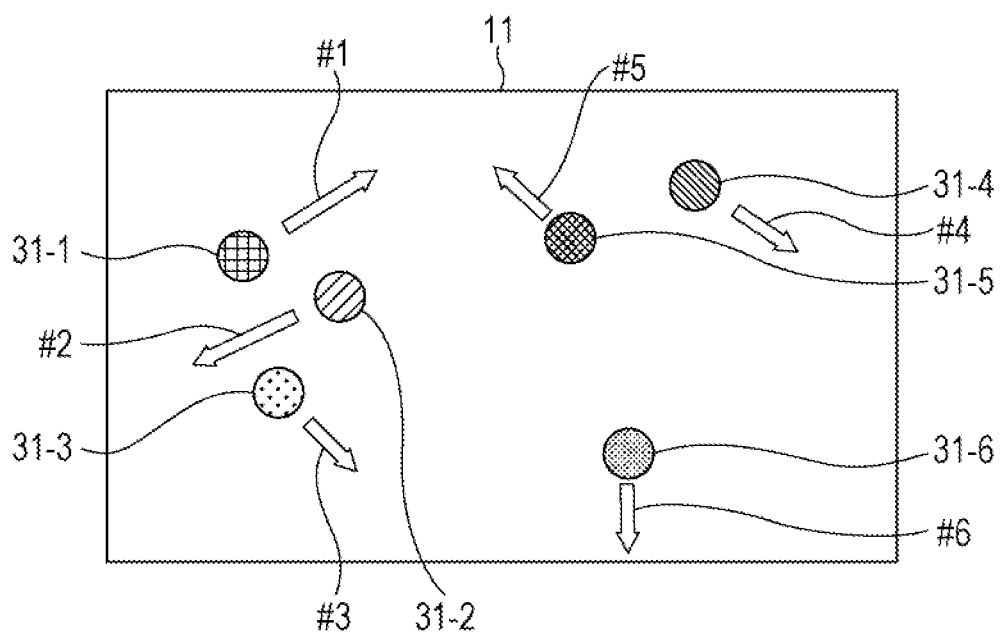
FIG. 7 illustrates an example of movement of the visualizer image.

FIG. 7 illustrates an example of movement of a visualizer image.

As shown by white arrows, the visualizer image includes circular images 31-1 to 31-6 that move at a constant speed in different directions from each other.

The circular image 31-1 moves from the current position to the upper right as shown by an arrow #1, while the circular image 31-2 moves from the current position to the lower left as shown by an arrow #2. The circular image 31-3 moves from the current position to the lower right as shown by an arrow #3, while the circular image 31-4 moves from the current position to the lower right as shown by an arrow #4. The circular image 31-5 moves from the current position to the upper left as shown by an arrow #5, while the circular image 31-6 moves downward from the current position as shown by an arrow #6.

When arriving at the edges of the screen, the circular images 31-1 to 31-6 bounce back in different directions. As described above, the visualizer image is like an image giving an impression that a plurality of circular images bounce around randomly.

FIG. 8 shows an example of an image subsequent to the image in FIG. 7.

FIG. 8 depicts a state where the circular images have moved near the edges of the screen individually. In this state, if a user performs a right drag movement from position P1 to position P2 as indicated by a solid line arrow, a "next song" gesture operation is detected and an arrow image 61 as shown in FIG. 9 appears. The arrow image 61 is an image of a rightward arrow displayed on the gesture operation image layer. The arrow image 61 appears briefly. Instead of the arrow image 61, it can be configured to display images in FIG. 10 and up when the "next song" gesture operation is detected.

Figure 10:
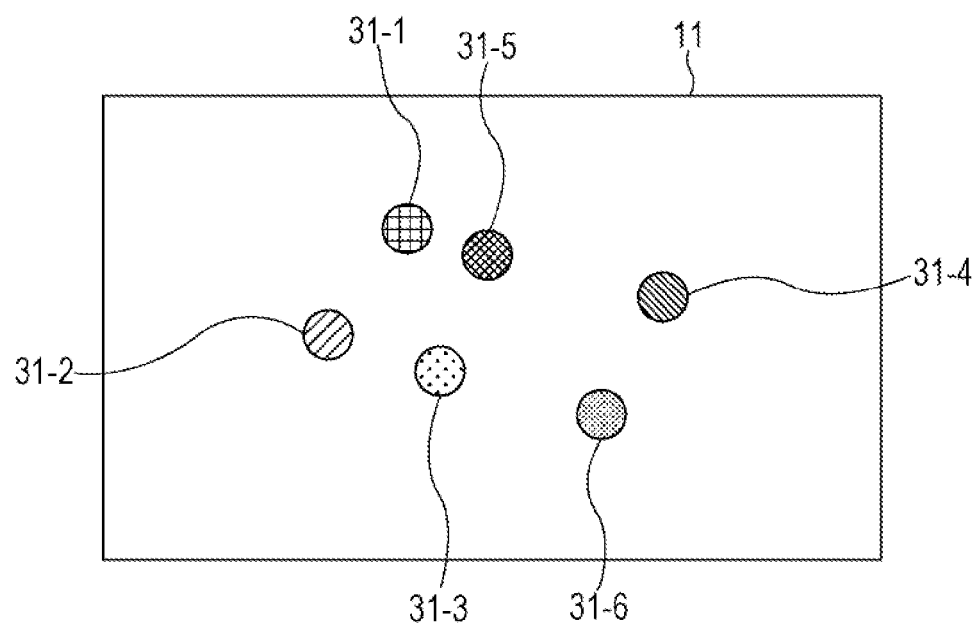
FIG. 10 illustrates an example of an image subsequent to the image in FIG. 9.

FIG. 10 shows an example of an image subsequent to the image in FIG. 9.

Figure 11:
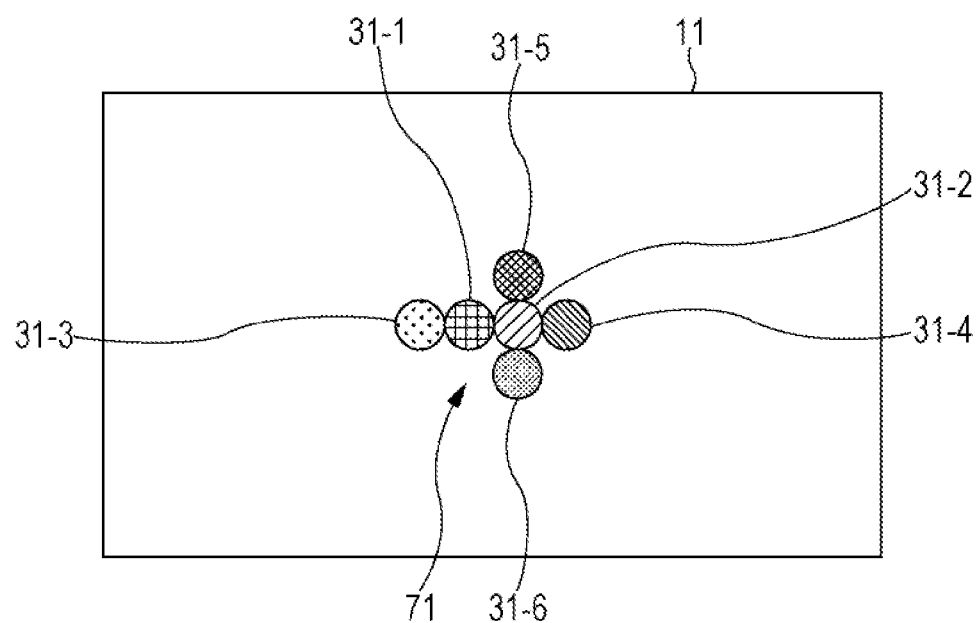
FIG. 11 illustrates an example of an image subsequent to the image in FIG. 10.

As shown in FIG. 10, the circular images 31-1 to 31-6 move from the respective positions where they were upon detection of the gesture operation to the vicinity of the center of the screen and stop at predetermined positions to form a feedback image 71 as shown in FIG. 11.

The feedback image 71 is formed by aligning the circular images 31-3, 31-1, 31-2, and 31-4 laterally and arranging the circular image 31-5 on the circular image 31-2 and arranging the circular image 31-6 under the circular image 31-2. The circular images 31-1 to 31-6 are laid out in this manner to represent a rightward arrow.

After the process of moving on to the next song is performed, the circular images 31-1 to 31-6 making up the feedback image 71 move away from each other and resume moving as decoration images making up a visualizer image. The duration of time that the feedback image 71 is being displayed is, for example, longer than the duration of time that the arrow image 61 is being displayed.

Figure 12:
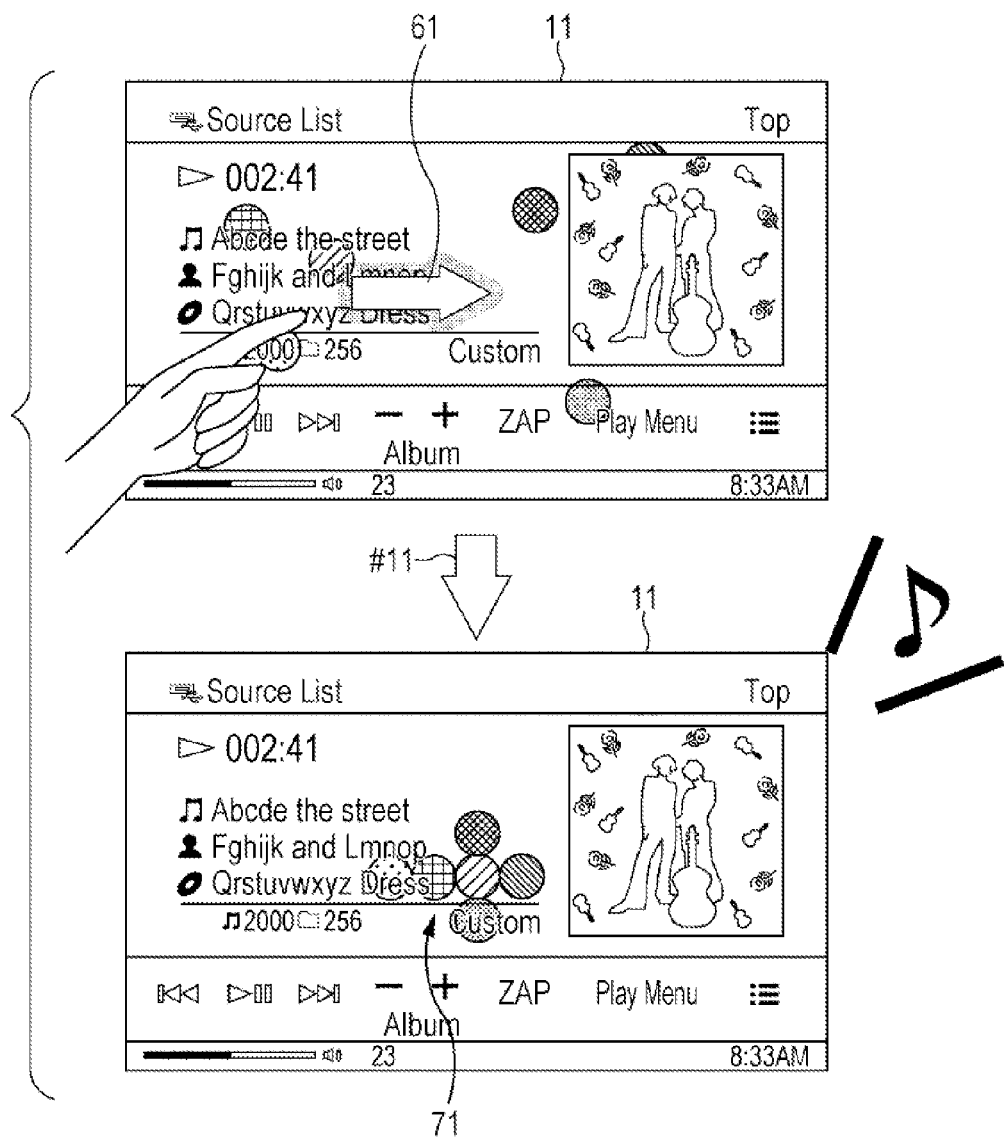
FIG. 12 illustrates exemplary transition of the music playback screen.

FIG. 12 illustrates exemplary transition of the music playback screen.

When a right drag movement is made on the music playback screen in which the visualizer image is displayed as a background of the song information as shown in the upper part of FIG. 12, the arrow image 61 is interposed on the song information.

After the arrow image 61 shows up, the feedback image 71 made up of the visualizer image is displayed as the background of the song information as shown below the arrow #11. In synchronization with the display of the feedback image 71, a predetermined sound is output from a speaker.

When another gesture operation is detected, a feedback image that represents a shape associated with the type of the gesture operation is displayed as a visualizer image in a similar manner. By way of example, when a left drag movement is performed and a "previous song" gesture operation is detected, a feedback image in the shape of a leftward arrow is made from the circular images 31-1 to 31-6.

Alternatively, when an up drag movement is performed and a "previous album" gesture operation is detected, a feedback image in the shape of an upward arrow is made from the circular images 31-1 to 31-6. Alternatively, when a down drag movement is performed and a "next album" gesture operation is detected, a feedback image in the shape of a downward arrow is made from the circular images 31-1 to 31-6. Note that the feedback image is not limited to images representing arrows. Images of various shapes representing gesture operations can be displayed as feedback images.

As described above, in the electronic apparatus 1, a GUI is implemented in which the visualizer function is associated with the feedback of a gesture operation from the viewpoint of design.

A user can confirm that the user's gesture operation was detected from the feedback image made up of the visualizer image.

Using the visualizer image as a component of the feedback image eliminates the necessity of reducing the brightness of the visualizer image upon providing feedback to the user, changing the layout of the song information and buttons, and some other types of processing.

Furthermore, provision of feedback with the entire visualizer image can improve visibility.

A series of processes of the electronic apparatus 1 to provide the above-described screen representation will be described with reference to a flow chart.

[Configuration Example of Electronic Apparatus]

Figure 13:
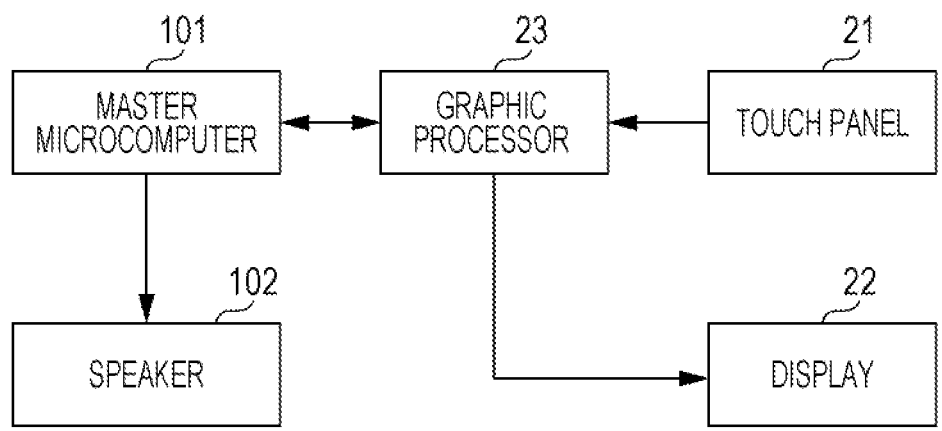
FIG. 13 is a block diagram showing an example of a hardware configuration of the electronic apparatus.

FIG. 13 is a block diagram showing an example of a hardware configuration of the electronic apparatus 1.

The electronic apparatus 1 includes a touch panel 21, a display 22, and a graphic processor 23, and also a master microcomputer 101 and a speaker 102.

The display 22 may be an LCD (Liquid Crystal Display) or organic EL (Electroluminescence) display and presents various types of screens, such as a menu screen and a music playback screen, under control of the graphic processor 23.

The touch panel 21 detects user's touch operations on the surface of the display unit 11 and outputs analog signals to the graphic processor 23 to indicate positions where the touch operations have been made.

The graphic processor 23 mutually communicates with the master microcomputer 101. The graphic processor 23 causes the various screens to appear on the display 22 on the basis of screen data supplied from the master microcomputer 101. In addition, the graphic processor 23 receives signals fed from the touch panel 21 and outputs information indicating the positions (coordinates) at which the touch operation was made to the master microcomputer 101.

The master microcomputer 101 includes a CPU (Central Processing Unit), a ROM (Read Only Memory), a RAM (Random Access Memory) and other components. The master microcomputer 101 executes programs stored in the ROM and controls operations of the entire electronic apparatus 1.

For example, the master microcomputer 101 controls the graphic processor 23 so as to display the music playback screen on the display 22. In addition, the master microcomputer 101 outputs audio signals to the speaker 102 so as to output a sound in synchronization with the display of the feedback image. The master microcomputer 101 also reproduces music data stored in a memory (not shown) so as to output music from the speaker 102.

The speaker 102 outputs sounds in response to the signals fed from the master microcomputer 101.

Figure 14:
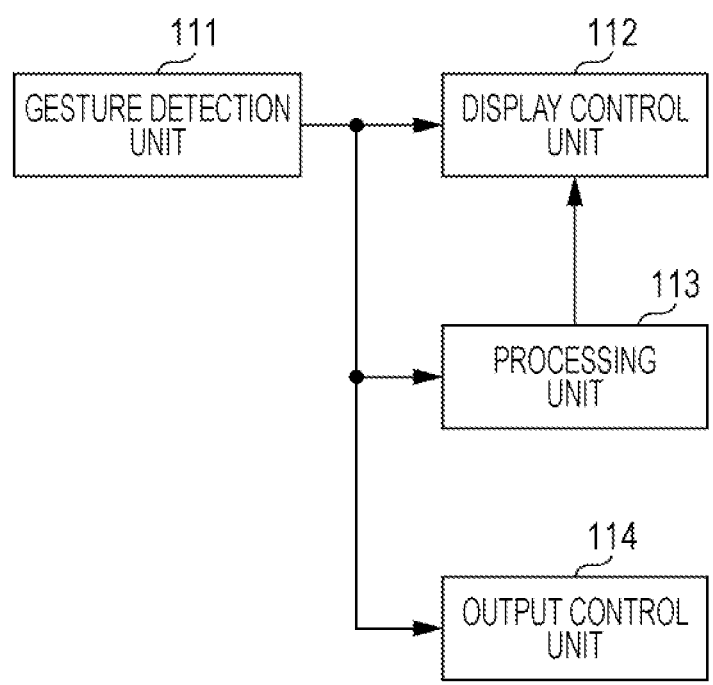
FIG. 14 is a block diagram showing an example of a functional configuration of the electronic apparatus.

FIG. 14 is a block diagram showing an example of a functional configuration of the electronic apparatus 1. Of the functional parts shown in FIG. 14 at least one part is implemented by running a predetermined program by the master microcomputer 101 shown in FIG. 13.

In the electronic apparatus 1, a gesture operation detection unit 111, a display control unit 112, a processing unit 113, and an output control unit 114 are implemented. The graphic processor 23 feeds information about the coordinates at which a touch operation was made to the gesture operation detection unit 111, display control unit 112, and processing unit 113.

The gesture operation detection unit 111 detects gesture operations on the basis of the information fed from the graphic processor 23. For example, the gesture operation detection unit 111 identifies the trajectory of a user's touch operation and determines that a gesture operation was made when the identified trajectory matches a predetermined trajectory pattern set in advance. The gesture operation detection unit 111 has preinstalled information about trajectories associated with gesture operations, such as "previous song" operation, "next song" operation, "previous album" operation, and "next album" operation.

When detecting a gesture operation, the gesture operation detection unit 111 outputs information about the type of the gesture operation performed by the user. The information output from the gesture operation detection unit 111 is supplied to the display control unit 112, processing unit 113, and output control unit 114.

The display control unit 112 supplies screen data to the graphic processor 23 so as to control screen representation on the display 22. When the information about the type of the gesture operation is fed from the gesture operation detection unit 111, the display control unit 112 controls the visualizer image displayed on the music playback screen so as to present a feedback image associated with the type of gesture operation.

The display control unit 112 also changes the screen representation on the display 22 in accordance with the process performed by the processing unit 113.

The processing unit 113 performs a process associated with the user's touch operation. When the performed process changes the screen representation, the processing unit 113 outputs information about the processing result to the display control unit 112.

For example, when the processing unit 113 determines that a "next song" gesture operation was made on the basis of the information fed from the gesture operation detection unit 111, the processing unit 113 switches to the next song to be played. In addition, the processing unit 113 outputs information indicating that the next song was selected to be played to the display control unit 112. The display control unit 112 changes the screen representation to show song information about the selected song.

When the information indicating that a gesture operation was made is supplied from the gesture operation detection unit 111, the output control unit 114 controls the speaker 102 so as to output a predetermined sound.

[Processes by Electronic Apparatus]

Figure 15:
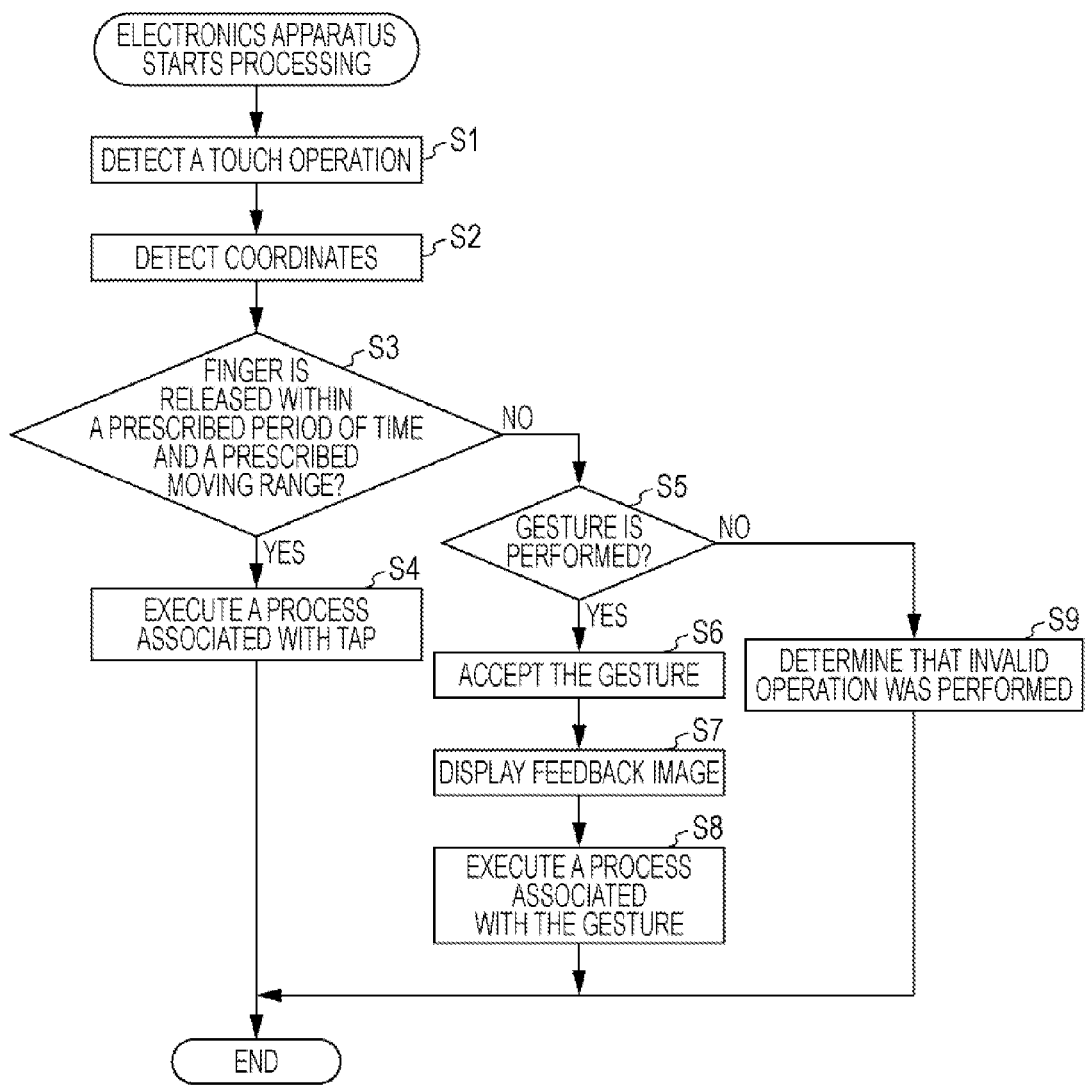
FIG. 15 is a flowchart describing a series of processes of the electronic apparatus.

With reference to the flowchart in FIG. 15, a series of processes performed by the electronic apparatus 1 will be described. The processes in FIG. 15 are initiated while the music playback screen in FIG. 3 is being displayed.

In step S1, the touch panel 21 detects a touch operation made by a user. The touch panel 21 outputs a signal to the graphic processor 23 so as to indicate the position at which the touch operation was performed.

In step S2, the graphic processor 23 detects the coordinates at which the touch operation was performed. The graphic processor 23 outputs information about the detected coordinates to the master microcomputer 101.

In step S3, the gesture operation detection unit 111 determines whether the user released his/her finger within a prescribed period of time and a prescribed movement range on the basis of the information fed from the graphic processor 23. In this embodiment, if the trajectory of the touch operation performed within the prescribed period of time is in the prescribed movement range, it is determined that a tap occurred, whereas if the trajectory is out of the prescribed movement range, it is determined that a drag occurred.

If it is determined in step S3 that the user released his/her finger within the prescribed period of time and the prescribed movement range, the processing unit 113 executes a process associated with the tap in step S4. For example, if the user tapped a pause button displayed in the operation button area 44, the processing unit 113 pauses the playback of the song currently playing.

On the other hand, if it is determined in step S3 that the user did not release his/her finger within the prescribed period of time and the prescribed movement range, the gesture operation detection unit 111 determines whether a gesture operation was performed or not in step S5. If the trajectory of the touch operation matches a preset trajectory pattern, the gesture operation detection unit 111 determines that a gesture operation was performed, whereas if the trajectory does not match the preset trajectory pattern, the gesture operation detection unit 111 determines that a drag, which is not a gesture operation, occurred.

When it is determined that a gesture operation was performed in step S5, the gesture operation detection unit 111 accepts the gesture operation in step S6. The gesture operation detection unit 111 outputs information about the type of accepted gesture operation.

In step S7, the display control unit 112 displays a feedback image that represents a shape associated with the type of the gesture operation performed by the user on the music playback screen. Specifically, the display control unit 112 shows a feedback image by moving individual circular images displayed as a visualizer image.

In step S8, the processing unit 113 executes a process associated with the gesture operation performed by the user.

On the other hand, when it is determined that a gesture operation was not performed in step S5, the gesture operation detection unit 111 determines in step S9 that an invalid operation was performed.

The series of processes is completed after a process associated with the tap is performed in step S4, after a process associated with the gesture operation is performed in step S8, or after it is determined that an invalid operation was performed in step S9. The above-describe processes are repeatedly performed while the music playback screen is being displayed.

Through the processes described above, a GUI is implemented in which a visualizer function is associated with the feedback of a gesture operation from the viewpoint of design.

[Modification]

The shape of decoration images making up a visualizer image is not limited to circular shapes.

Figure 16:
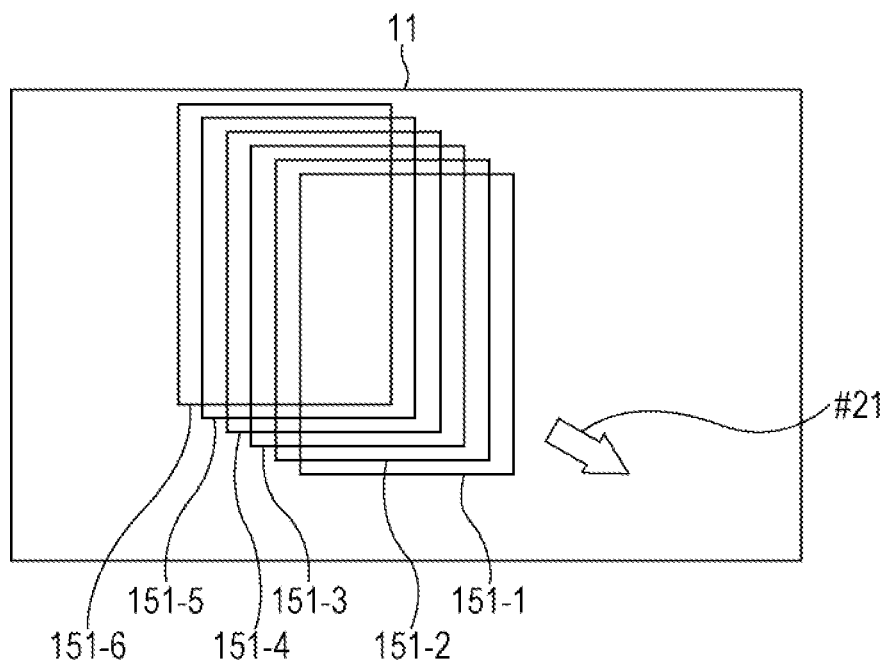
FIG. 16 illustrates another example of the visualizer image.

FIG. 16 illustrates another example of a visualizer image.

The visualizer image in FIG. 16 includes six rectangular frame-like images, namely frame images 151-1 to 151-6. The frame images 151-1 to 151-6 are arranged linearly from the upper left to a nearly center part of the screen and partially overlap each other. The frame images 151-1 to 151-6 are not images to be used for operation, but are decoration images to be displayed for decorating the screen.

The frame images 151-1 to 151-6 move respectively from the upper left to the lower right of the screen as indicated by a white arrow #21. The forwardmost image disappears when arriving at a predetermined position and reappears as the rearmost image. The white arrow #21 shown in FIG. 16 is not displayed in reality.

When a right drag movement is made on the music playback screen on which the visualizer image is displayed and is detected as a "next song" gesture operation, an arrow image 61, which is an image of a rightward arrow, briefly appears. Even in this modification, it can be designed not to display the arrow image 61.

Figure 17:
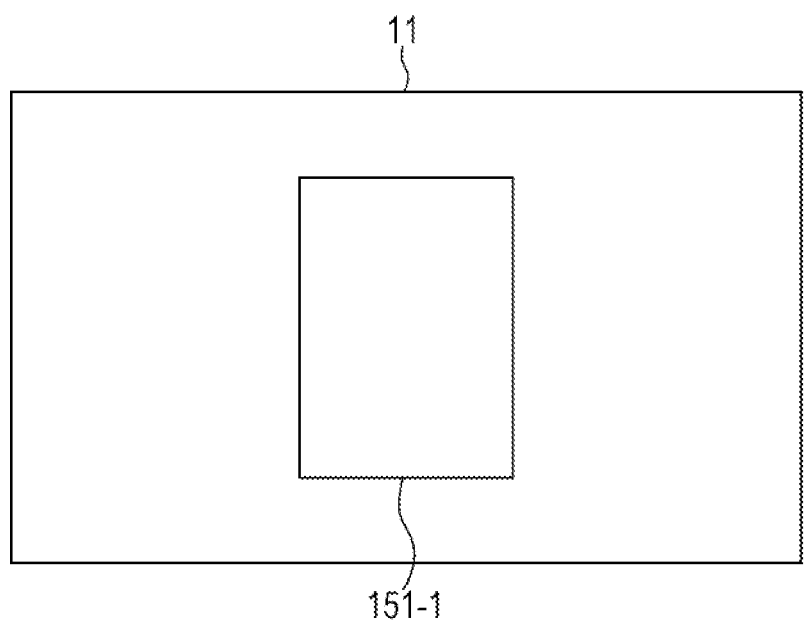
FIG. 17 illustrates an example of an image subsequent to the image in FIG. 16.
Figure 18:
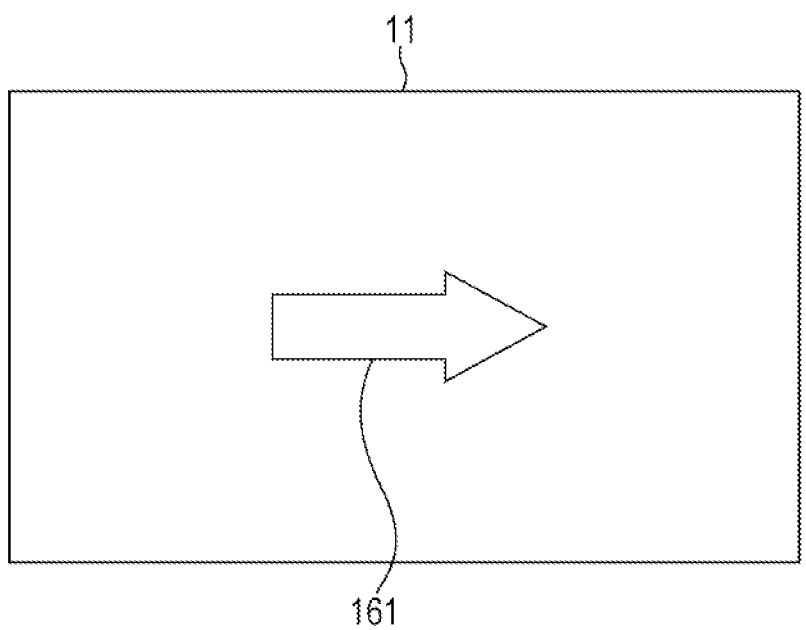
FIG. 18 illustrates an example of an image subsequent to the image in FIG. 17.

In addition, as shown in FIG. 17, one of the frame images 151-1 to 151-6, for example, only a frame image 151-1 at the forwardmost position at that time is displayed at the center of the screen. The frame image 151-1 displayed at the center of the screen is transformed into a feedback image 161 as shown in FIG. 18. The feedback image 161 is an image representing a single rightward arrow.

This example demonstrates that a single frame image included in a visualizer image is a component making up a feedback image.

As described above, various shapes of images can be used as the decoration images making up a feedback image. Alternatively, all of the decoration images making up a visualizer image are not necessary to form a feedback image, but some of the decoration images or a single decoration image can make up a feedback image.

<Second Embodiment (example of feedback using trajectory image)>

Next, an example will be described in which a feedback image is presented with a trajectory image, as a component of the feedback image, that is an image representing the trajectory of a touch operation by a user.

In this example, the image making up the feedback image is not an image displayed through the visualizer function, but a trajectory image. The trajectory image is, for example, a colored image at a predetermined level of transparency displayed on a layer over the song information layer. The trajectory image is not an image to be used for operation, but is a decoration image displayed to decorate the screen.

Figure 19:
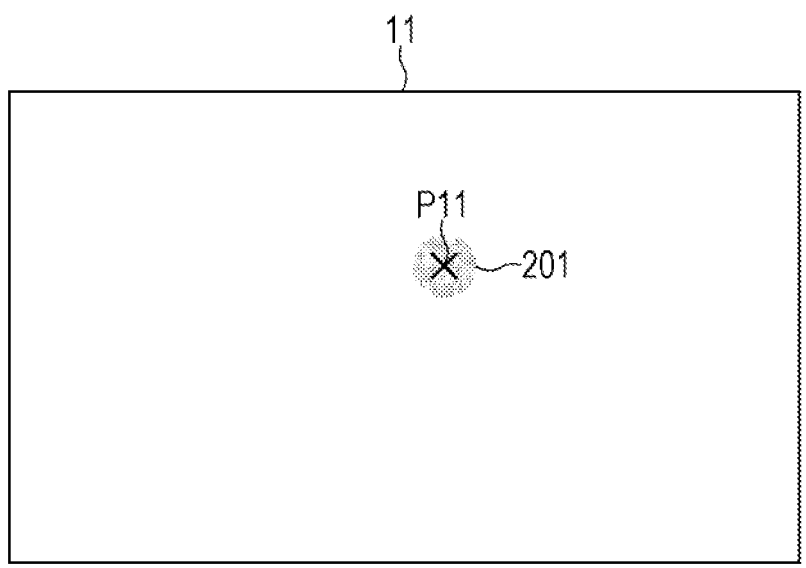
FIG. 19 illustrates an example of a trajectory image.

FIG. 19 illustrates an example of a trajectory image.

Figure 20:
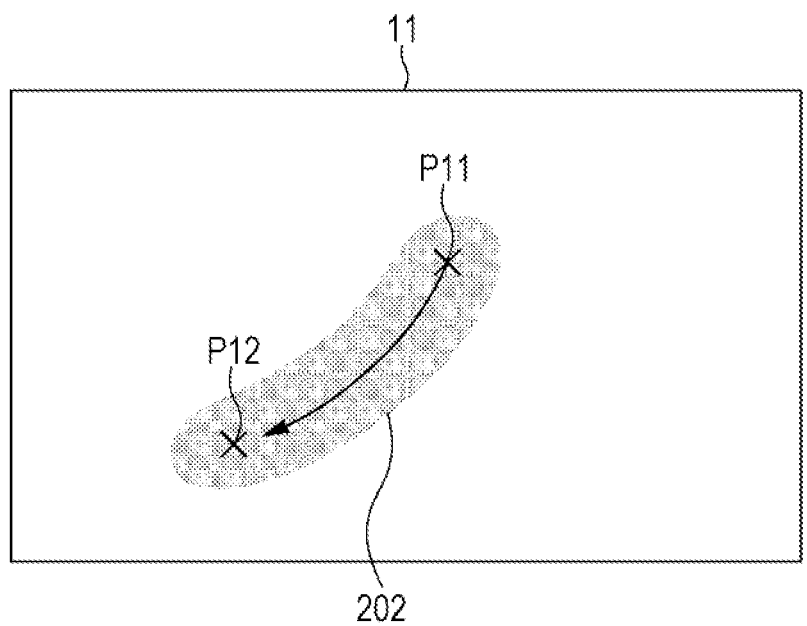
FIG. 20 illustrates an example of an image subsequent to the image in FIG. 19.

As shown in FIG. 19, when a user performs a touch operation at a position P11 on the screen, for example, a trajectory image 201 appears around the position P11. When the user moves his/her finger in a lower right direction to a position P12, as indicated by a solid line arrow in FIG. 20, while continuing to touch the screen, a trajectory image 202 appears along the trajectory of the user's finger.

Thus, the electronic apparatus 1 presents a trajectory image that represents the trajectory of the touch operation performed by the user. The presentation of the trajectory image is made by the display control unit 112 that has received information from the graphic processor 23.

Figure 21:
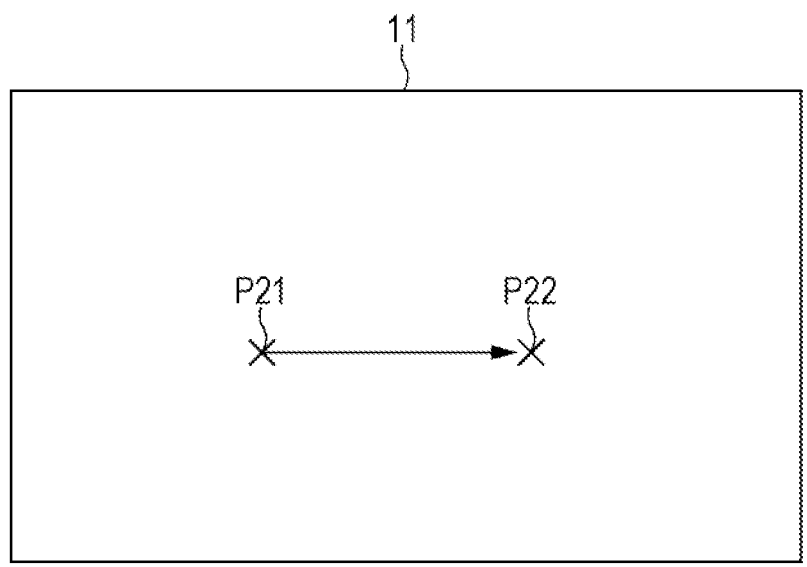
FIG. 21 illustrates an example of a gesture operation.

FIG. 21 illustrates an example of a gesture operation.

Figure 22:
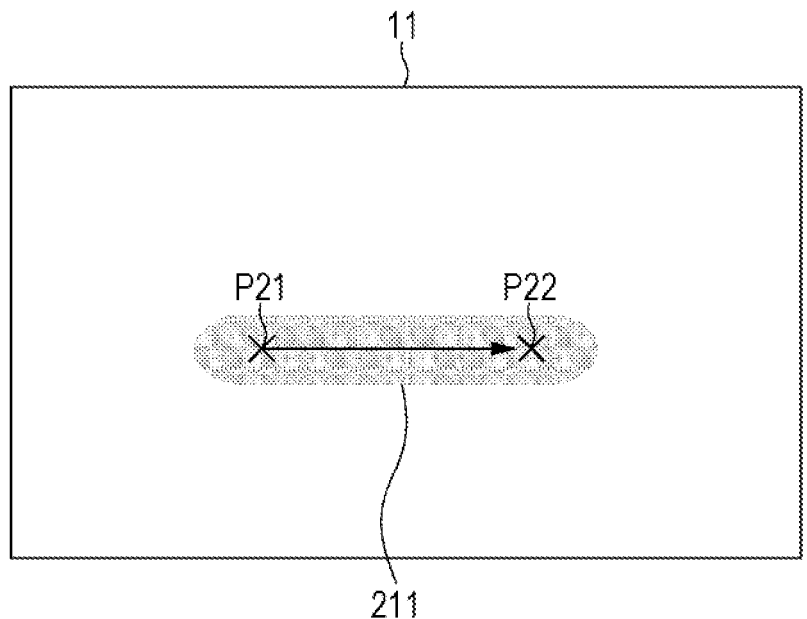
FIG. 22 illustrates another example of the trajectory image.

As indicated by a solid line arrow in FIG. 21, if a right drag movement is performed from a position P21 to a position P22, a trajectory image 211 as shown in FIG. 22 appears and a "next song" gesture operation is detected by the gesture operation detection unit 111.

Figure 23:
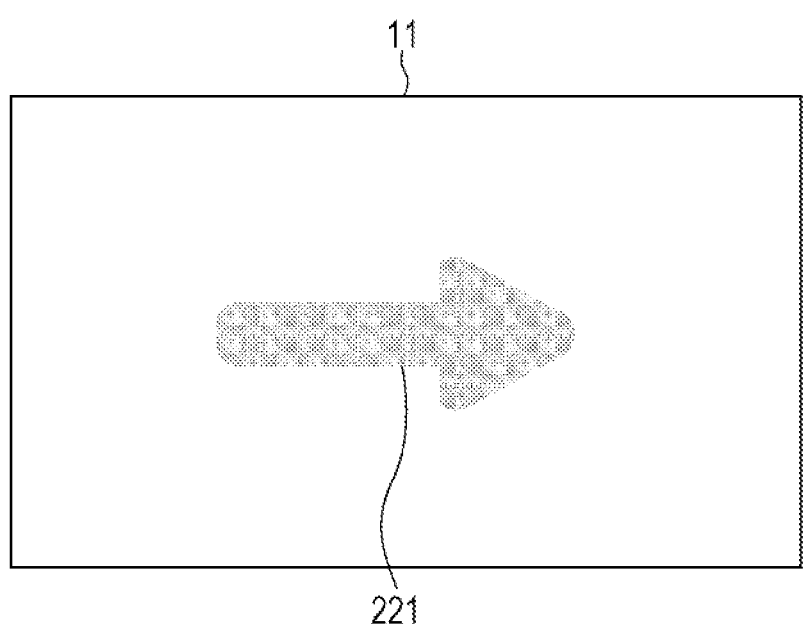
FIG. 23 illustrates an example of an image subsequent to the image in FIG. 22.

FIG. 23 shows an example of an image subsequent to the image in FIG. 22.

The detection of the "next song" gesture operation by the gesture operation detection unit 111 causes the display control unit 112 to transform the trajectory image 211 to provide a feedback image 221 representing a shape associated with the type of the gesture operation. The feedback image 221 is an image representing a rightward arrow made up of the trajectory image 211.

Figure 24:
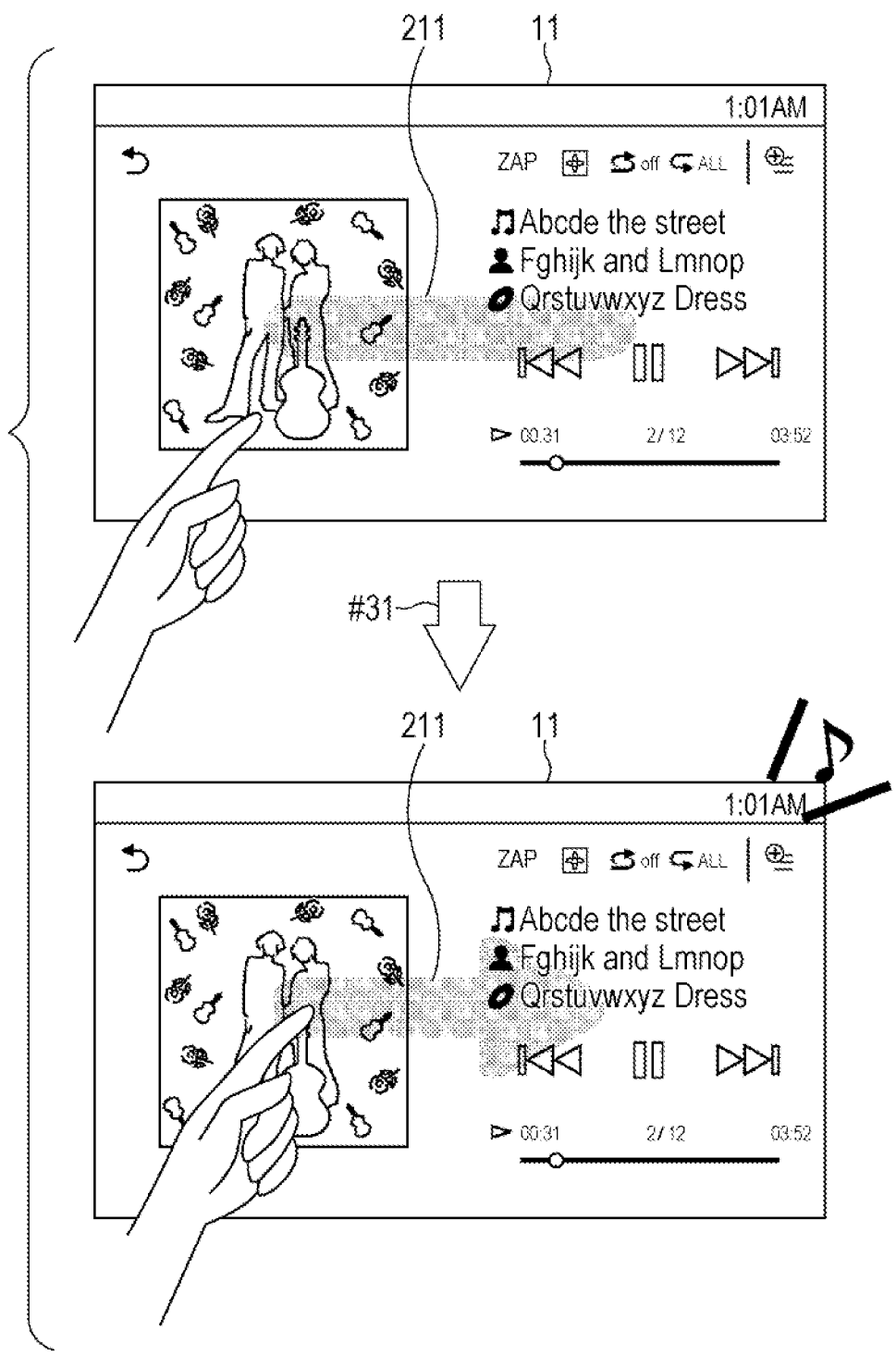
FIG. 24 illustrates exemplary transition of the music playback screen.

FIG. 24 illustrates exemplary transition of the music playback screen.

When a right drag movement is made on the music playback screen as shown in the upper part of FIG. 24, a trajectory image 211 is displayed over song information.

After the trajectory image 211 shows up, a feedback image 221 formed by transforming the trajectory image 211 is displayed over the song information as shown below an arrow #31. In synchronization with the representation of the feedback image 221, a predetermined sound is output from a speaker.

Likewise, when a gesture operation of other type is detected, a feedback image representing a shape associated with the type of the gesture operation is displayed by using the trajectory image. By way of example, when a left drag movement is performed and a "previous song" gesture operation is detected, a feedback image representing a leftward arrow, which is transformed from the trajectory image, appears.

In addition, when an up drag movement is performed and a "previous album" gesture operation is detected, a feedback image representing an upward arrow, which is transformed from the trajectory image, appears. When a down drag movement is performed and a "next album" gesture operation is detected, a feedback image representing a downward arrow, which is transformed from the trajectory image, appears. Note that the feedback image is not limited to images representing arrows. Various shapes of images representing gesture operations can be displayed as feedback images.

As described above, in the electronic apparatus 1, a GUI is implemented in which the function of representing the trajectory of the user's touch operation is associated with the feedback of the gesture operation from the viewpoint of design.

The user can confirm that the user's gesture operation was detected from the feedback image made up of the trajectory image.

[Processes by Electronic Apparatus]

Figure 25:
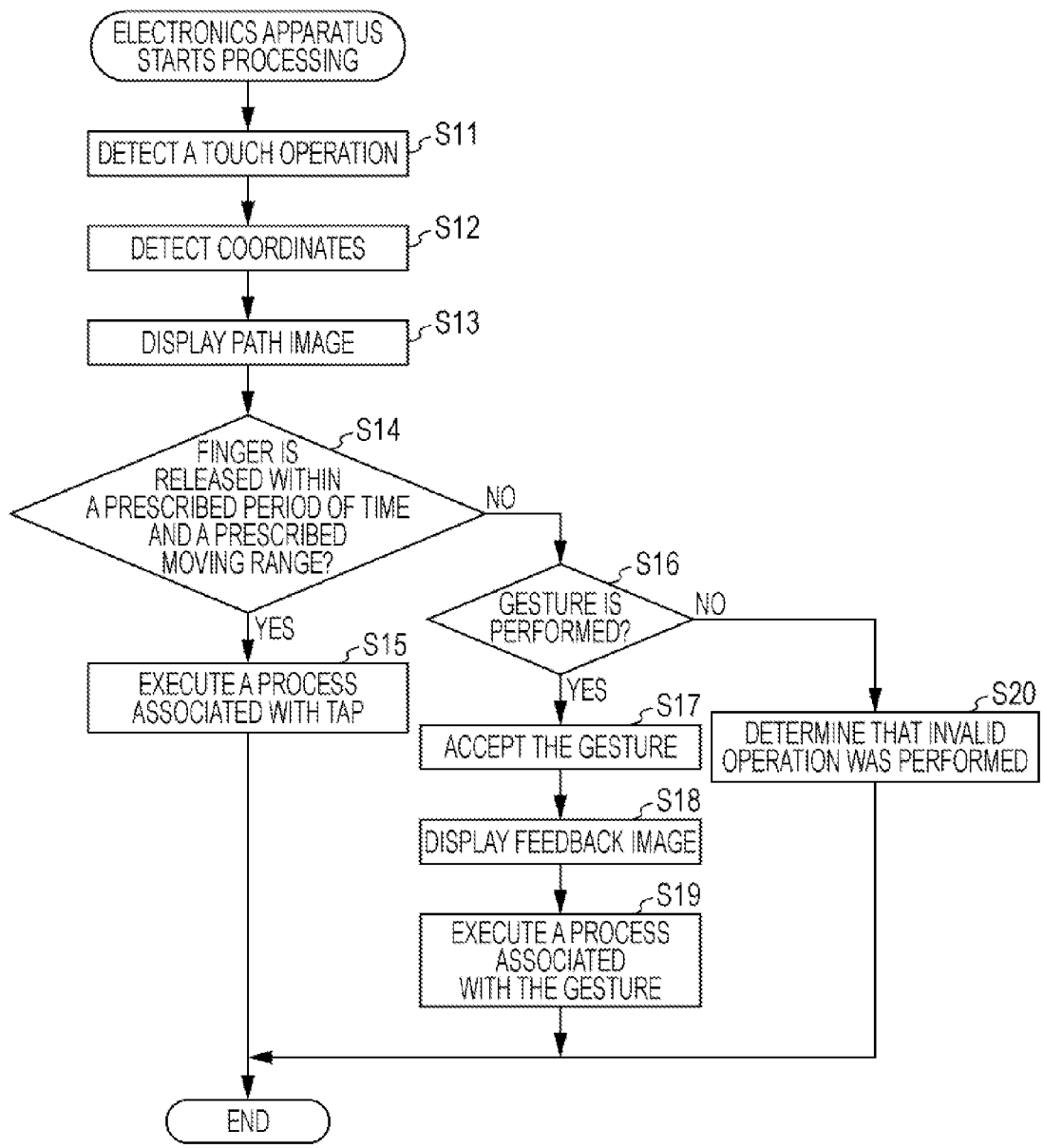
FIG. 25 is a flowchart describing another series of processes of the electronic apparatus.

With reference to a flow chart in FIG. 25, a series of processes for displaying a feedback image made up of a trajectory image, which are performed by the electronic apparatus 1, will be described. The processes in FIG. 25 are basically the same processes as those shown in FIG. 15, and therefore the same descriptions are not repeated.

In step S11, the touch panel 21 detects a touch operation made by a user.

In step S12, the graphic processor 23 detects the coordinates at which the touch operation was performed.

In step S13, the display control unit 112 displays a trajectory image representing the trajectory of the touch operation.

In step S14, the gesture operation detection unit 111 determines whether the user released his/her finger within a prescribed period of time and a prescribed movement range.

If it is determined in step S14 that the user released his/her finger within the prescribed period of time and the prescribed movement range, the processing unit 113 executes a process associated with the tap in step S15.

On the other hand, if it is determined in step S14 that the user did not release his/her finger within the prescribed period of time and the prescribed movement range, the gesture operation detection unit 111 determines whether a gesture operation was performed or not in step S16.

When it is determined that a gesture operation was performed in step S16, the gesture operation detection unit 111 accepts the gesture operation in step S17.

In step S18, the display control unit 112 displays a feedback image that represents a shape associated with the gesture operation performed by the user. Specifically, the display control unit 112 displays a feedback image that is transformed from the trajectory image.

In step S19, the processing unit 113 executes a process associated with the gesture operation performed by the user.

On the other hand, when it is determined that a gesture operation was not performed in step S16, the gesture operation detection unit 111 determines in step S20 that an invalid operation was performed.

The series of processes is completed after a process associated with the tap is performed in step S15, after a process associated with the gesture operation is performed in step S19, or after it is determined that an invalid operation was performed in step S20. The above-describe processes are repeatedly performed while the music playback screen is being displayed.

<Modification>

In the foregoing embodiments, the described feedback image was formed in response to a gesture operation performed on a music playback screen; however, the screen on which the gesture operation is performed can be any other screens. A menu screen, a playback screen of still images and moving images, and a text input screen are examples on which gesture operations are performed before the feedback images, which are made up of visualizer images or trajectory images, are displayed.

In addition to the visualizer image and trajectory image that are used to make up a feedback image, various types of decoration images displayed during detection of gesture operations can be used to form the feedback image.

[Example of Computer Configuration]

The aforementioned series of processes can be implemented by hardware or software. To perform the series of processes by software, a program constituting the software is installed on a computer incorporated in a purpose-built hardware or a general-purpose personal computer from a recording medium of the programs.

FIG. 26 is a block diagram showing an example of a hardware configuration of a computer that executes the aforementioned series of processes.

A CPU 251, a ROM 252, and a RAM 253 are interconnected with a bus 254.

The bus 254 is further connected with an input/output interface 255. The input/output interface 255 is connected with an input unit 256, which is implemented by a keyboard, a mouse and other input devices, and an output unit 257, which is implemented by a display, a speaker and other output devices. Additionally, the input/output interface 255 is connected with a storage unit 258, which is implemented by a hard disk, a nonvolatile memory, and so on, a communication unit 259, which is implemented by a network interface or the like, and a drive 260 that drives a removal medium 261.

In the thus-configured computer, for example, the CPU 251 loads a program stored in the storage unit 258 to the RAM 253 via the input/output interface 255 and bus 254 and runs the program, thereby executing the aforementioned series of processes.

The program to be run by the CPU 251 is provided, for example, from the removal medium 261 with the program stored or via a wired or wireless transmission medium, such as a local area network, Internet, and digital broadcasting, and is installed in the storage unit 258.

Note that the program to be run by the computer may be a program in which processes are performed in a time series in the order as described herein, in parallel, or at a necessary time such as when invocation is made.

It should be understood that embodiments of the present technology are not limited to the foregoing embodiments, and various changes and modifications may be made without departing from the spirit of the present technology.

By way of example, the present technology can be implemented by cloud computing in which a plurality of apparatuses share and collaboratively handle a single function via a network.

In addition, each step in the aforementioned flow charts can be performed by a single apparatus or can be shared by a plurality of apparatuses.

Furthermore, a single step may include a plurality of processes that can be performed by a single apparatus or can be shared by a plurality of apparatus.

[Combination Examples of Elements]

The present technology can be configured as follows.

[1] A display control device including:

a display control unit that displays a decoration image on a display unit, the decoration image being different from images used for operation;

a detection unit that detects a user's touch operation made on the display unit; and a processing unit that executes a process associated with the touch operation involving a predetermined trajectory, wherein when the touch operation involving the predetermined trajectory is detected while the decoration image is displayed, the display control unit displays a feedback image that is made up of the decoration image and indicates that the touch operation involving the predetermined trajectory has been detected.

[2] The display control device cited in [1], wherein the display control unit displays the decoration image moving around within a screen by a visualizer function.

[3] The display control device cited in [2], wherein
the display control unit displays a plurality of the decoration images and the feedback image to be displayed is made up of all of the decoration images.

[4] The display control device cited in [3], wherein
the display control unit moves the decoration images individually from their respective positions at a time when the touch operation involving the predetermined trajectory is detected to display the feedback image.

[5] The display control device cited in [2], wherein
the display control unit displays a plurality of the decoration images and transforms one of the decoration images to display the feedback image.

[6] The display control device cited in any of [2] to [5], wherein
the display control unit displays information about a song that is currently being played over the decoration image.

[7] The display control device cited in [1], wherein
the display control unit displays an image representing the trajectory made by the touch operation as the decoration image and transforms the image representing the trajectory to display the feedback image.

[8] The display control device cited in [7], wherein
the display control unit displays the decoration images over information about a song that is currently being played.

[9] The display control device cited in any of [1] to [8], further including:
an output control unit that outputs a predetermined sound when the touch operation involving the predetermined trajectory is detected.

[10] A display control method including:
displaying a decoration image on a display unit, the decoration image being different from images used for operation;
detecting a user's touch operation made on the display unit; and
executing a process associated with the touch operation involving a predetermined trajectory, wherein
when the touch operation involving the predetermined trajectory is detected while the decoration image is displayed, a feedback image is displayed that is made up of the decoration image and indicates that the touch operation involving the predetermined trajectory has been detected.

[11] A program causing a computer to execute processing including:
displaying a decoration image on a display unit, the decoration image being different from images used for operation;
detecting a user's touch operation made on the display unit; and
executing a process associated with the touch operation involving a predetermined trajectory, wherein
when the touch operation involving the predetermined trajectory is detected while the decoration image is displayed, a feedback image is displayed that is made up of the decoration image and indicates that the touch operation involving the predetermined trajectory has been detected.

What is claimed is:

1. A display control device comprising:
a display control unit configured to display a decoration image on a display unit, the decoration image being different from images used for operation;
a detection unit configured to detect a user's touch operation made on the display unit; and
a processing unit configured to execute a process associated with the touch operation involving a predetermined trajectory,
wherein, in an event of the touch operation involving the predetermined trajectory is detected while the decoration image is displayed, the display control unit is configured to display a feedback image that is made up of the decoration image and indicate that the touch operation involving the predetermined trajectory has been detected,
wherein the decoration image moves around within a screen of the display unit, wherein the feedback image is made by stopping the decoration image at a predetermined position on the screen.

2. The display control device according to claim 1, wherein the display control unit is configured to display the decoration image moving around within the screen by a visualizer function.

3. The display control device according to claim 1, wherein the display control unit is configured to display a plurality of the decoration images, and wherein the feedback image to be displayed is made up of all of the plurality of the decoration images.

4. The display control device according to claim 1, wherein the display control unit is configured to move a plurality of the decoration images individually from their respective positions at a time when the touch operation involving the predetermined trajectory is detected to display the feedback image.

5. The display control device according to claim 1, wherein the display control unit is configured to display a plurality of the decoration images and transform one of the plurality of the decoration images to display the feedback image.

6. The display control device according to claim 1, wherein the display control unit is configured to display information about a song that is currently being played over the decoration image.

7. The display control device according to claim 1, wherein the display control unit is configured to display an image representing the predetermined trajectory made by the touch operation and transform, after displaying the image, the decoration image to the feedback image.

8. The display control device according to claim 7, wherein the display control unit is configured to display the image interposed on information about a song that is currently being played.

9. The display control device according to claim 1, further comprising: an output control unit configured to output a predetermined sound in an event of the touch operation involving the predetermined trajectory is detected.

10. A display control method comprising:
displaying a decoration image on a display unit, the decoration image being different from images used for operation;
detecting a user's touch operation made on the display unit; and
executing a process associated with the touch operation involving a predetermined trajectory,
wherein, in an event of the touch operation involving the predetermined trajectory is detected while the decoration image is displayed, a feedback image is displayed that is made up of the decoration image and indicates that the touch operation involving the predetermined trajectory has been detected,
wherein the decoration image moves around within a screen of the display unit, wherein the feedback image is made by stopping the decoration image at a predetermined position on the screen.

11. A non-transitory computer-readable storage medium, having stored thereon, a set of computer-executable instructions which when executed by a computer causes the computer to perform the steps comprising:

displaying a decoration image on a display unit, the decoration image being different from images used for operation;

detecting a user's touch operation made on the display unit; and executing a process associated with the touch operation involving a predetermined trajectory, wherein, in an event of the touch operation involving the predetermined trajectory is detected while the decoration image is displayed, a feedback image is displayed that is made up of the decoration image and indicates that the touch operation involving the predetermined trajectory has been detected, wherein the decoration image moves around within a screen of the display unit, wherein the feedback image is made by stopping the decoration image at a predetermined position on the screen.

12. A display control device comprising:

a display control unit configured to display a decoration image on a display unit, the decoration image being different from images used for operation;

a detection unit configured to detect a user's touch operation made on the display unit; and a processing unit configured to execute a process associated with the touch operation involving a predetermined trajectory, wherein, in an event of the touch operation involving the predetermined trajectory is detected while the decoration image is displayed, the display control unit is configured to display a feedback image that is made up of the decoration image and indicate that the touch operation involving the predetermined trajectory has been detected, wherein the display control unit is configured to display a plurality of the decoration images and the feedback image to be displayed is made up of all of the plurality of decoration images, and wherein the display control unit is configured to move the plurality of decoration images individually from their respective positions at a time when the touch operation involving the predetermined trajectory is detected to display the feedback image.

* * * * *